(12) United States Patent
Spitzer

(10) Patent No.: US 7,448,681 B1
(45) Date of Patent: Nov. 11, 2008

(54) UNIFORM SEAT COVER AND SEAT FASHIONED WITH SAME

(76) Inventor: Shawn D. Spitzer, 944 W. Main St., #2010, Mesa, AZ (US) 85201

( * ) Notice: Subject to any disclaimer, the term of this patent is extended or adjusted under 35 U.S.C. 154(b) by 605 days.

(21) Appl. No.: 10/647,992

(22) Filed: Aug. 26, 2003

Related U.S. Application Data

(63) Continuation of application No. 09/973,203, filed on Oct. 9, 2001, now abandoned.

(51) Int. Cl.
A47C 31/00 (2006.01)
A41D 13/00 (2006.01)

(52) U.S. Cl. .............................. 297/228.13; 297/219.1; 297/219.11; 297/228.1; 2/69; D6/611

(58) Field of Classification Search ... 297/228.1–218.4, 297/228.12, 228.13, 224, 225, 217.7, 336, 297/335, DIG. 6, 228.11, 219.1, 219.19, 297/229; D6/610–611; 5/490, 496, 498; 2/69, 69.5, 70–72, 115, 113, 244, 119; 66/169 R, 66/171, 172 R
See application file for complete search history.

(56) References Cited

U.S. PATENT DOCUMENTS

| | | | | |
|---|---|---|---|---|
| 1,964,242 A | * | 6/1934 | Behrle | 297/223 |
| 2,266,505 A | * | 12/1941 | McCormick | 297/228.1 |
| 3,194,601 A | | 7/1965 | Hoven et al. | |
| 3,775,775 A | * | 12/1973 | Mazzenga | 2/80 |
| 4,036,524 A | * | 7/1977 | Takamatsu | 297/219.1 |
| 4,047,756 A | * | 9/1977 | Ney | 297/219.1 |
| 4,232,898 A | * | 11/1980 | Bodrero | 297/228.1 |
| 4,296,498 A | * | 10/1981 | Vinson | 2/115 |
| 4,400,030 A | * | 8/1983 | Maruzzo et al. | 297/228.1 |
| 4,694,511 A | | 9/1987 | Estes et al. | |
| 4,697,511 A | * | 10/1987 | Davis et al. | 100/37 |
| 5,028,472 A | * | 7/1991 | Gray | 428/100 |
| 5,112,104 A | | 5/1992 | De Giacomi | |
| 5,123,699 A | * | 6/1992 | Warburton | 297/219.1 |
| 5,234,252 A | * | 8/1993 | Wallach | 297/229 |
| D365,958 S | * | 1/1996 | Bolwski | D6/611 |
| 5,507,551 A | | 4/1996 | Barry | |
| 5,707,107 A | * | 1/1998 | Melone | 297/228.1 |
| D396,983 S | | 8/1998 | Taylor | |
| 5,803,539 A | | 9/1998 | Dewar et al. | |
| 5,920,903 A | * | 7/1999 | Koehntop et al. | 2/69 |
| 6,050,639 A | * | 4/2000 | Horn | 297/229 |
| 6,179,381 B1 | | 1/2001 | Gevaert | |
| 6,345,866 B1 | * | 2/2002 | Jackson et al. | 297/228.12 |
| D454,748 S | * | 3/2002 | Spitzer | D6/611 |
| 6,848,746 B2 | * | 2/2005 | Gentry | 297/380 |

* cited by examiner

Primary Examiner—David R Dunn
Assistant Examiner—Erika Garrett
(74) Attorney, Agent, or Firm—Parsons & Goltry; Robert A. Parsons; Michael W. Goltry

(57) ABSTRACT

A seat includes a seat portion and an attached seat back portion and an attached uniform including a uniform top fitted over the seat back portion and a uniform bottom fitted over the seat portion. The uniform top and the uniform bottom support uniform adornment that identifies the members of a group, profession, organization, or establishment.

4 Claims, 5 Drawing Sheets

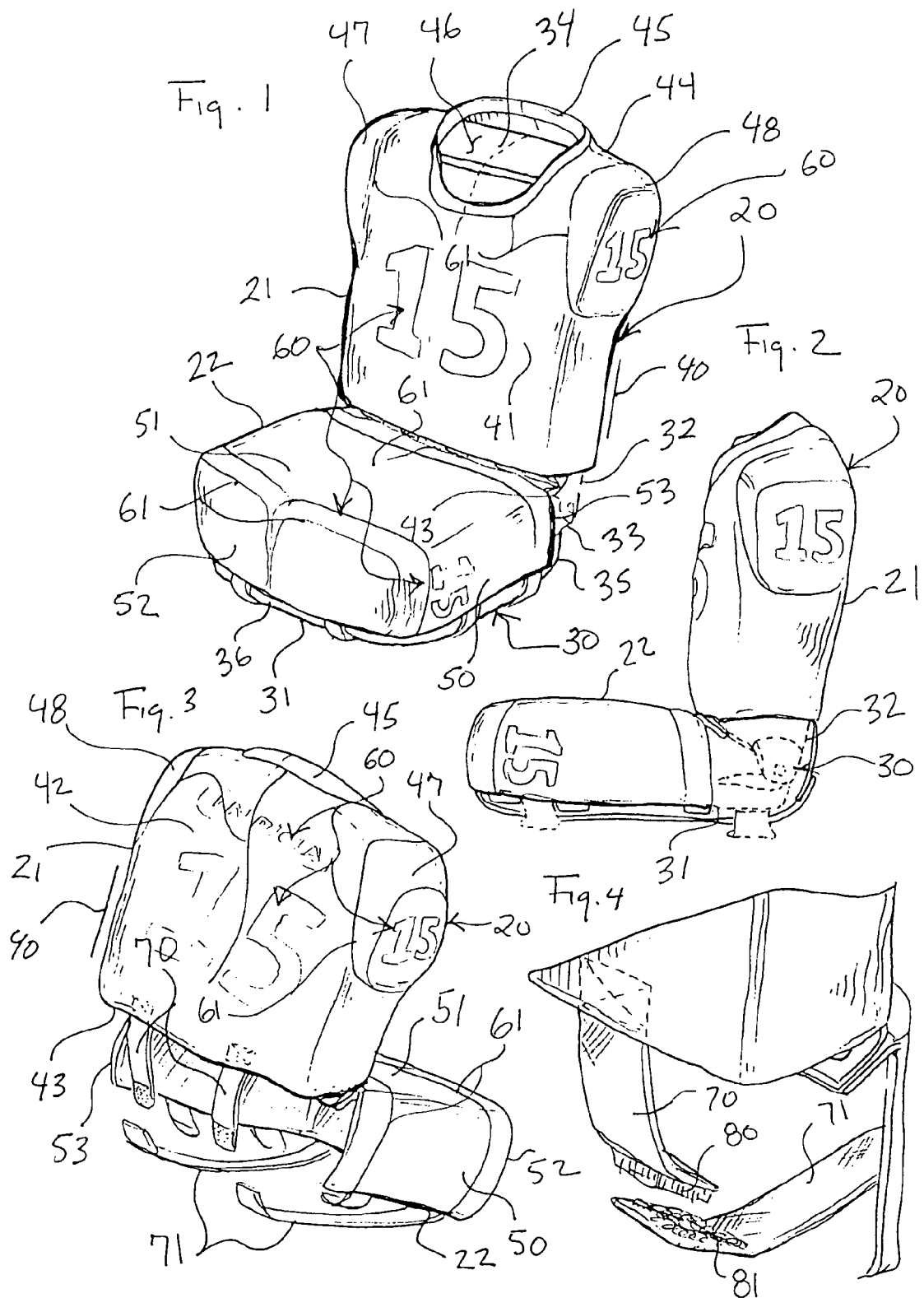

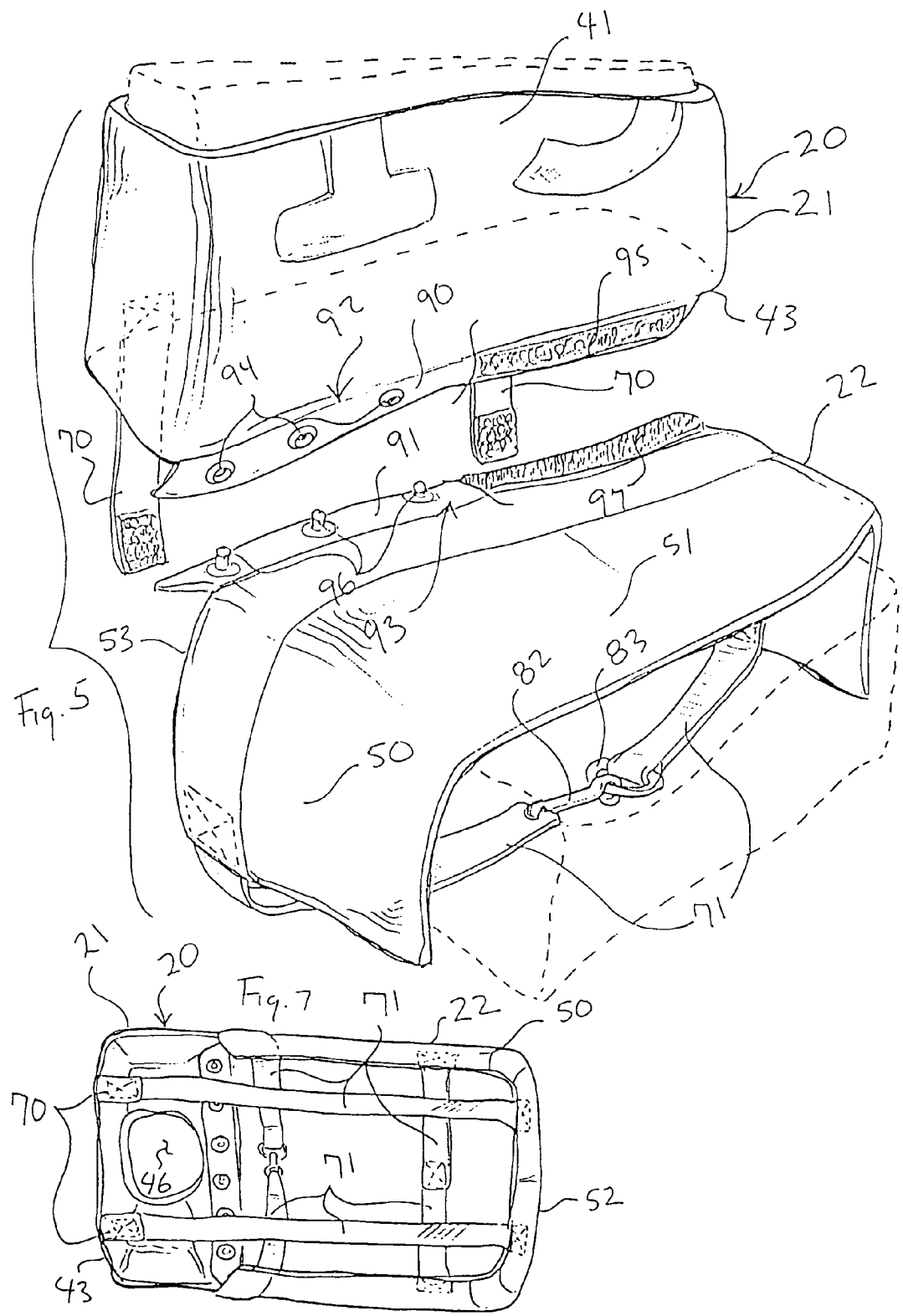

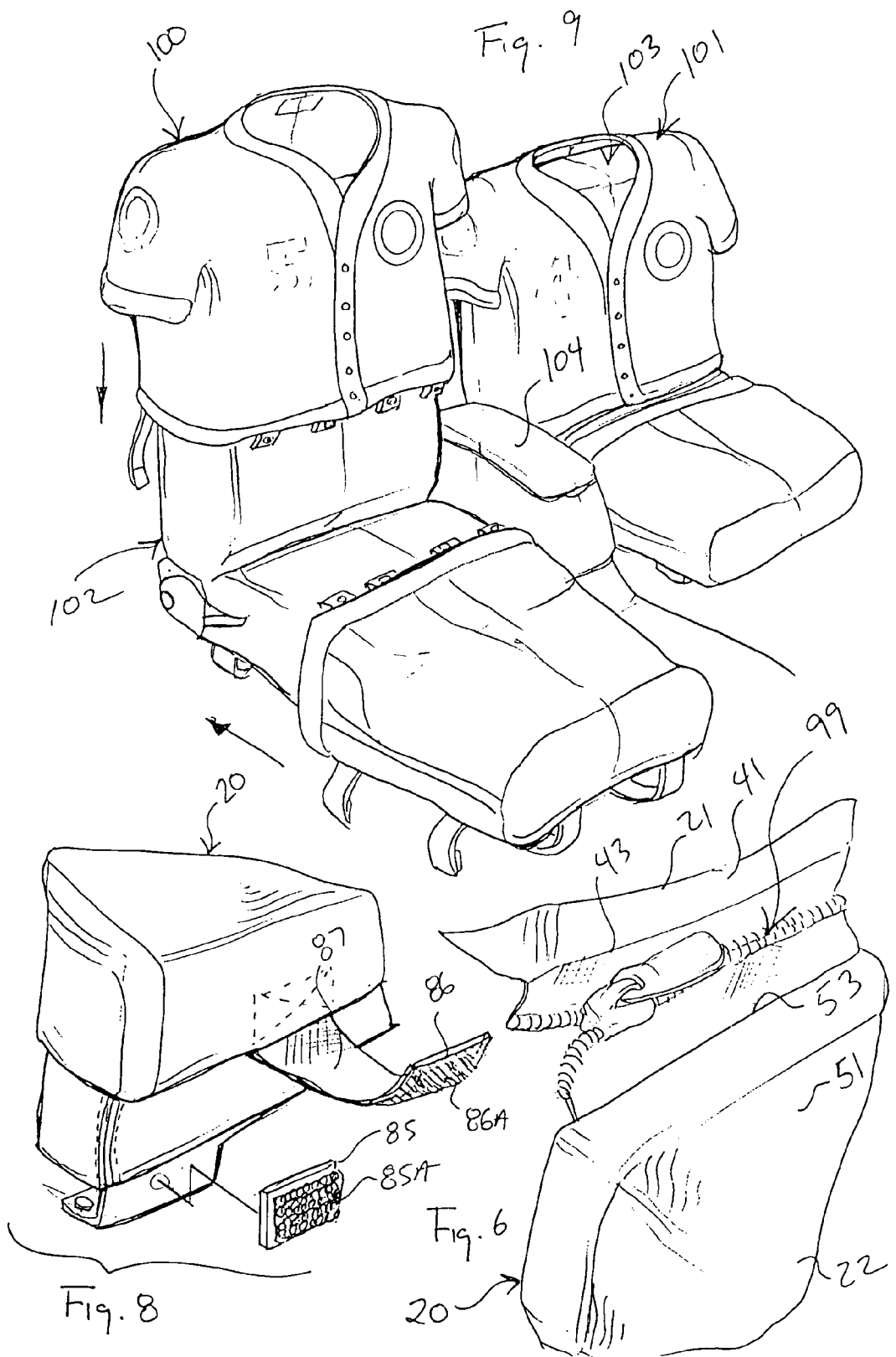

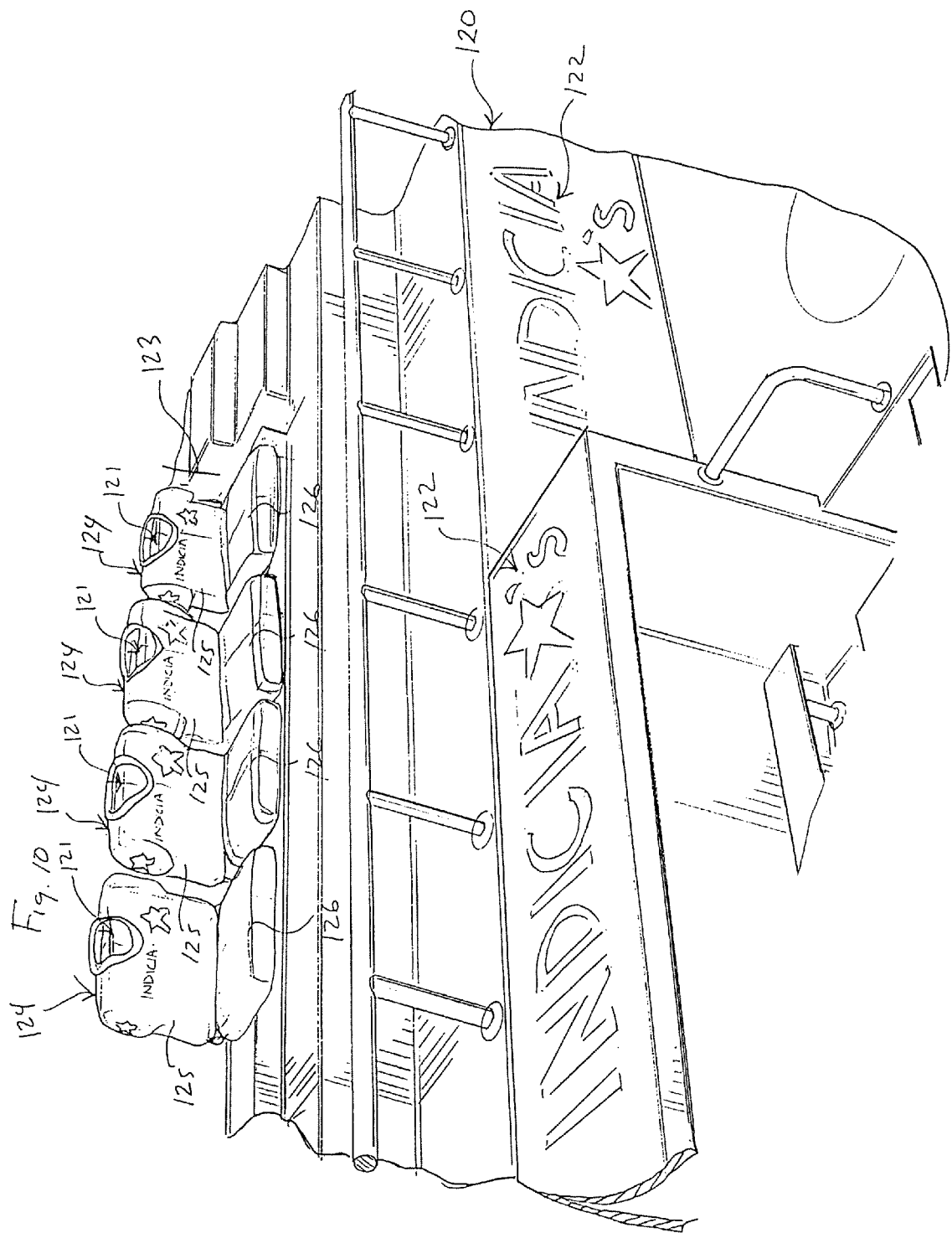

US 7,448,681 B1

UNIFORM SEAT COVER AND SEAT FASHIONED WITH SAME

This application is a continuation of application Ser. No. 09/973,203, filed 9 Oct. 2001, which claimed priority to patent application Ser. No. 29/128,872, filed 5 Sep. 2000 now Pat. No. D454,748.

FIELD OF THE INVENTION

This invention relates to uniforms and to seats and to seat covers and, more particularly, to a uniform seat cover and to seats fashioned with uniform seat covers.

BACKGROUND OF THE INVENTION

A uniform is an identifying outfit or style of dress worn by the members of a given group, whether a team, a profession, an organization, an establishment, etc. Uniforms are important because give others the ability to distinguish between the members of different groups. Exemplary of the many types of uniforms are those worn by members of amateur and professional sport teams such as basketball, football, baseball, soccer, hockey and softball teams, and those worn by members of military organizations such as the United States Army, Navy, Air Force and Marines, etc.

People are usually very proud of their memberships, whether past or present, and many organizations, especially sports organizations, enjoy a following of ardent enthusiasts. For sports fans and other fans and for those of proud membership, uniforms are highly valued and essentially memorialize an appreciation of membership and fans' admiration of certain groups, professions and organizations.

In response to this, it would be highly desirable to provide a way of exploiting uniform dress in combination with seats and especially vehicle seats and further in combination with spectator seats of a stadium or arena that is decorated with team adornment of a sports team organization.

SUMMARY OF THE INVENTION

The above problems and others are at least partially solved and the above purposes and others realized in new and improved apparatus that includes a seat having an attached uniform. The seat includes a seat portion and an attached seat back portion. The uniform includes a uniform top and a uniform bottom. The uniform top is fitted over the seat back portion and the uniform bottom is fitted over the seat portion. The uniform top and the uniform bottom support uniform adornment that identifies a member of a given group. The seat back portion includes a lower end attached to the seat portion and an opposing upper end, and the uniform top includes a collared neck opening situated at the upper end of the seat back portion. The uniform top includes one of a) sleeves located on either side of the neck opening and b) arm openings located on either side of the neck opening. Further the uniform top and the uniform bottom support straps that secure the uniform top and the uniform bottom to the seat and to each other. An engagement assembly is carried by one of the uniform top and the uniform bottom and a detachably engaged complemental engagement assembly is carried by the other of the uniform top and the uniform bottom. Preferably, the engagement assembly is supported at an end of the one of the uniform top and the uniform bottom and the complemental engagement assembly is supported at a confronting end of the other of the uniform top and the uniform bottom.

In accordance with the principle of the invention, further is a stadium for team sports events with seats for spectators and team adornment of a team decorating the stadium. Each of the seats includes a seat portion and an attached seat back portion and is furnished with an attached uniform that includes a uniform top fitted over the seat back portion and a uniform bottom fitted over the seat portion. The uniform top and the uniform bottom of each of the uniforms supports uniform adornment that identifies members of the team, as with the team adornment adorning the stadium.

Consistent with the foregoing, the invention also contemplates associated methods.

BRIEF DESCRIPTION OF THE DRAWINGS

Referring to the drawings:

FIG. 1 is a perspective view of a uniform attached to a seat, in accordance with the principle of the invention, the uniform including a uniform top fitted over a seat back portion of the seat and a uniform bottom fitted over a seat portion of the seat;

FIG. 2 is a side elevation of the embodiment depicted in FIG. 1;

FIG. 3 is a rear elevation of the uniform of FIG. 1;

FIG. 4 is an enlarged fragmented perspective view of the uniform of FIG. 1 illustrating an attachment assembly;

FIG. 5 is an enlarged fragmented perspective view of the uniform of FIG. 1 illustrating the uniform top detached from the uniform bottom, an engagement assembly carried by the uniform top and a detachably engagable complemental engagement assembly carried by the uniform bottom;

FIG. 6 is an enlarged fragmented perspective view of a zipper assembly that is capable of being employed for detachably securing a uniform top to a uniform bottom of a uniform constructed and arranged in accordance with the principle of the invention;

FIG. 7 is a bottom plan of the uniform of FIG. 1, with the uniform top shown attached to the uniform bottom;

FIG. 8 is a fragmented perspective view of a uniform attached to a seat, in accordance with the principle of the invention, an engagement element carried by the uniform and a detachably engagable complemental engagement element exploded from the seat;

FIG. 9 is a perspective view of a pair of seats each having an attached uniform, in accordance with the principle of the invention;

FIG. 10 is a representation of a stadium for team sports events with seats for spectators and team adornment of a team decorating the stadium and uniforms attached to the seats, in accordance with the principle of the invention;

DETAILED DESCRIPTION OF PREFERRED EMBODIMENTS

Figure 11:
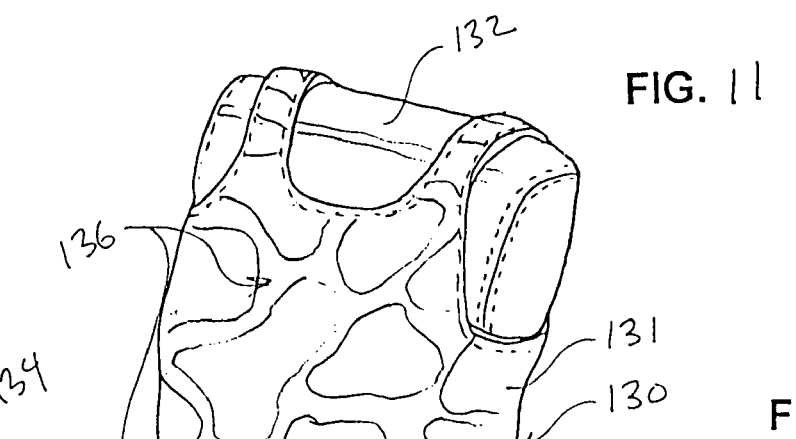
FIG. 11 is a perspective view of a uniform attached to a seat, in accordance with an alternate embodiment of the invention, the uniform including a uniform top fitted over a seat back portion of the seat and a uniform bottom fitted over a seat portion of the seat.

Turning now to the drawings, in which like reference characters indicate corresponding elements throughout the several views, attention is first directed to FIG. 1 in which is seen a uniform, embodying the principle of the instant invention, generally indicated by the reference character 20 and including a uniform top 21 fitted over a seat back portion 32 of a seat 30 and a uniform bottom 22 fitted over a seat portion 31 of seat 30. FIG. 2 is exemplary of a side elevation of the embodiment depicted in FIG. 1, with the opposite side elevation being a mirror image. Seat back portion 32 includes a lower end 33 attached to a rear end 35 of seat portion 31 and an opposing upper end 34, and together they are capable of supporting a person in a sitting position. Seat portion 31 includes a forward end 36 that opposes its rear end 35. Seat 30 is generally representative of a vehicular seat such as a car seat and the like and is designed to be attached inside the passenger compartment of a vehicle. The invention can be employed with any seat of a type including a seat portion having an attached seat back portion. It is instructive of the invention that when uniform 20 is attached to seat 30, seat back portion 32 and seat portion 31 look like the torso and upper legs from waist to knees of a uniformed member of a group. Top 21 is sized and shaped to be capable of being fitted over seat back portion 32 and bottom 22 is sized and shaped to be capable of being fitted over seat portion 31. Seat 30 can be of any size and top 21 and bottom 22 are sized appropriately so that they can be installed in accordance with the teachings herein. Seat 30 is representative of seat that is capable of accommodating a single person in a seated position, and yet seat 30 can be an elongated bench that is capable of supporting a plurality of individuals in seated positions, one beside the other. If a uniform constructed and arranged in accordance with the invention is provided in connection with an elongated seat, namely, a bench, it can be furnished to represent a plurality of uniforms side-by-side if desired and the uniforms in this embodiment can be the same or different.

Preferably, top 21 and bottom 22 are constructed of cloth material, whether natural or synthetic and whether woven or unwoven and any desired combination of natural and/or synthetic materials can be used in addition to other pliant materials. Each can be furnished with padding or padded features if desired and are assembled from various parts with sewing and/or gluing and each can be fashioned integrally as well. In accordance with the invention, uniform 20 can be fashioned from a pre-existing uniform, an authentic uniform, or made so as to be a replica of a uniform.

Top 21 and bottom 22 together represent a uniform or in other words an identifying outfit or style of dress worn by the members of a given group, whether a team, a profession, an organization, an establishment, etc. Exemplary of the many types of uniforms are those worn by members of amateur and professional sport teams such as basketball, football, baseball, soccer, hockey and softball teams, and those worn by members of military organizations such as the United States Army, Navy, Air Force and Marines, and various sub-groups and organizations thereof, etc. Examples of other uniforms are those worn by chefs, the members of foreign military organizations, the members of past military organizations, etc. Still other groups, professions and organizations exist in which their members wear uniforms and this invention contemplates the top 21 and bottom 22 can be fashioned, styled and configured to represent any such uniform including any associated adornments, clothing styles, ornamentation and indicia, pockets, plackets, long sleeves, short sleeves, no sleeves, etc.

In the embodiment depicted in FIG. 1, top 21 and bottom 22 represent the identifying outfit or style of dress worn by the members of a football team, with top 21 representing the football jersey of the uniform and bottom 22 representing the football pants of the uniform. And so top 21 includes a body 40 having a front side 41 and a back side 42 (FIG. 4). Body 40 further includes an open lower end 43 and a shouldered upper end 44. A collar 45 is formed at upper end 44, which defines a neck opening 46 and sleeves 47,48 are disposed along either side of neck opening 46 at upper end 44. Sleeves 47,48 are representative of short sleeves. Further to FIGS. 1 and 3, bottom 22 is characterized by a substantially U-shaped sidewall 50 that depends from major panel 50. Bottom 22 includes a forward end 52, which is essentially closed by sidewall 50, and a rearward end 53, which is essentially open. Sleeves 47,48 can be replaced simply with arm openings as with a sleeveless jersey.

Top 21 and bottom 22 together support uniform adornment that is characterized by not only the style of top 21 but also uniform indicia 60 carried by top 21 and bottom 22, which adornment identifies or otherwise represents the identifying outfit of style of dress worn by, in accordance with the instant embodiment, members of a football team. Uniform indicia 60 include jersey indicia supported by top 21 and pants indicia supported by bottom 22. If desired, pants indicia and any associated pants adornments can be supported by top 21 including, for instance, waistband adornment, etc. It is instructive of the principle of the invention that football uniforms are emblazoned with jersey indicia that ornament the jersey and pants indicia that ornament the pants and the combination of the two identify the members of that specific football team and this is precisely what constitutes the jersey and pants indicia, namely, indicia 60. And so indicia 60 include numbers located at front and back sides 41,42 and at sleeves 47,48 of top 21 and along the sides of bottom 22. The jersey and pants indicia, which together constitute indicia 60, are also intended to include coloring, team logos and other team identifying indicia in addition perhaps to the name of a given player, and indicia 60 are imprinted or otherwise applied to the external surfaces of top 21 and bottom 22. Indicia 60 are that of any sports team. Preferably, top 21 and bottom 22 are fashioned with indications 61 that further help represent collar 45 and sleeves 47,48 in connection with top 21 and pant legs in connection with bottom 22 as generally illustrated in FIGS. 1 and 2. Preferably, indications 61 include stitched features. Indications 61 can also be applied indicia, applied ribbing or other form of attached feature, etc.

Further to FIG. 1, it is instructive of the invention that top 21 fits over seat back portion 32 of seat 30, bottom 22 fits over seat portion 31 of seat 30, and that top 21 attaches to bottom 22. Properly fitted to a seat, lower end 43 of top 21 at front face 41 meets rearward end 53 of bottom 22 at portion 51 and these described edges of top 21 and bottom 22 detachably secure each other and this is discussed in greater detail, infra. Top 21 and bottom 22 are sized and shaped adequately so as to fit well over the seat back and seat portions 32,31, respectively. Sleeves 47,48 are located at upper end 44 of seat back portion 32 at either side thereof and neck opening 46 is positioned centrally over upper end 44. Preferably, top 21 and bottom 22 overly and protect the majority of the external surfaces of seat 30 so as to protect seat 30 from wear and tear and from exposure to sunlight and from becoming stained, etc.

It is preferable to secure top 21 and bottom 22 to seat 30 and for this top 21 and bottom 22 are fashioned with attached straps 70,71, respectively, as seen best in FIGS. 3 and 7. Straps 70,71 are attached with stitching and gluing and other ways of providing attachment can be used as well. Straps 70 are attached to lower end 43 of top 21 at back side 42, and straps 71 are attached along the lower edge of sidewall 50. Straps 70,71 can be attached at other locations and any desired number of each can be employed in accordance with specific needs, and they can be made to be adjustable, elastic, etc. A variety of straps 71 are employed, including opposing pairs of straps 71 at the sides of bottom 22 that are capable of being passed along the bottom of a seat portion, the ends of which are engagable to one another so as to secure bottom 22 to the seat portion. Other ones of straps 71 at forward end 52 of bottom 22 are capable of being passed along the bottom of a seat portion, the ends of which are engagable to ends of straps 70 so as to secure bottom 22 to top 21 and further bottom 22 and top 21 to a seat. The ends of straps 70,71 are furnished with attachment pairs for facilitating their mutual engagement such as engagable clasps, hook and loop fastening structure, mutual snaps and the like. As a matter of example, FIG. 4 illustrates an end of one of straps 70 supporting a hook medium 80 and an engagable end of one of straps 71 furnished with a loop medium 81, and this can be reversed. Further as a matter of example in FIG. 5, shown is an end of one of straps 71 furnished with an attached hook 82 and an engagable end of an opposing one of straps 71 furnished with an attached ring 83, and this can be reversed. Hook 82 is engagable to ring 83 and this combination is exemplary of a clasp assembly and other clasp forms can be employed.

To provide attachment of uniform 20 to a seat, the invention also contemplates the desirability of providing a seat and seat cover 20 with mutual attachment pairs and exemplary of this teaching is the illustration of FIG. 8, which shows an attachment element 85 for attachment to a seat and a detachably engagable complemental attachment element 86 carried by seat cover 20, whether by top 21 or bottom 22. In FIG. 8, attachment element 85 is a loop medium 85A that attaches to the seat with an adhesive backing and complemental attachment element 86 is a hook medium 86A carried by an attached strap 87. Attachment element 85 can be attached to a seat in other ways and mutual snap or other suitable form of fastening structure can be employed between seat cover 20 and a seat. Those having regard for the art will appreciate that any suitable number of engagement pairs can be used to secure a uniform of the invention to a seat in accordance with the instant teachings and that engagement pairs are reversible.

Regarding FIG. 5, a flap 90 is attached to lower end 43 of top 21 at front side 41 and a flap 91 is attached to rearward end 53 of bottom 22 at portion 51. Flap 90 is an extension of front side 41 and extends along substantially the entire width of front side 41. Flap 91 is an extension of portion 51 and extends along substantially the entire width of portion 51. Flap 90 supports an engagement assembly 92 and flap 91 supports a detachably engagable complemental engagement assembly 93, which secure to one another in a preferred installation of uniform 20 to a seat as previously described. In the embodiment depicted in FIG. 5, assembly 92 includes a plurality of female elements 94 attached toward one end of flap 90 and a loop medium 95 attached toward the other side of flap 90, and assembly 93 includes a plurality of male elements 96 attached to toward one end of flap 91 and a hook medium 97 attached toward the other end of flap 91. Female elements 94 are capable of receiving and coupling male elements 96 and loop medium 95 is capable of engaging and securing hook medium 97. The combination of female and male elements 94,96 is exemplary of a mutual snap fastening structure and other forms can be used. The position of female and male elements 94,96 is reversible, as is the case with loop medium 95 and hook medium 97. Although snap fastening structure is used in the instant embodiment in combination with the hook and loop fastening structure, one or the other can be employed. Other fastening structure can be used for attaching the edge of lower end 43 of top 21 at front side 41 to the confronting edge of rearward end 53 of bottom 22 at portion 51 and exemplary of this teaching is the attached zipper assembly 99 depicted in FIG. 6.

As mentioned previously, uniform 20 can be configured to resemble the uniform worn by the members of any group, profession or organization and exemplary of this teaching is the illustration set forth in FIG. 9, which depicts a pair of uniforms 100,101 that are each common to uniform 20 and include substantially the same elements, with the exception that each resembles a baseball uniform. Uniform 100 is shown as it would appear partially installed upon one car seat 102 and uniform 101 is shown as it would appear installed upon another car seat 103. In the embodiment of FIG. 9, car seats 102,103 are situated on either side of a console 104 and this combination is representative of the driver and passenger seats of many types of passenger vehicles.

Another exemplary embodiment of the invention is depicted in FIG. 10, in which is seen a representation of a stadium 120 for team sports events with seats 121 for spectators and team adornment or indicia 122 of a team decorating surfaces of stadium 120. Seats 121 are each common to seat 30 in that they each include a seat portion and an attached seat back portion. Seats 121 are situated in a row 123 and it is envisioned that stadium 120 will have a large number of rows of seats for accommodating large numbers of spectators. In FIG. 10, stadium 120 is a baseball stadium and adornment or indicia 122 represent a baseball team and are applied by painting, imprinting, with attached banners and/or decals, etc.

In accordance with the principle of the invention, seats 121 are furnished with attached uniform 124, which are each common to uniform 20 and include substantially the same elements and are each installed to a seat in the same manner as uniform 20. Uniforms 124 represent baseball uniform having adornment, which includes style and attached indicia, that identify the members of the baseball team as represented by adornment or indicia 122, and include uniform tops 125 fitted over the seat back portions of seats 121 and uniform bottoms 126 fitted over the seat portions of seats 121. Although stadium 120 is representative of a baseball stadium and uniforms 124 baseball uniforms, stadium 120 be representative of a football stadium, a basketball stadium, a hockey stadium, etc., and uniforms 124 representative of those worn by the members of a football team, a basketball team, a hockey team, etc.

FIG. 10 is instructive of the combination of stadium 120 for team sports events with seats 121 for spectators and team indicia 122 of a team adorning stadium 120, with each of seats 121 having an attached uniform including top 125 fitted over the seat back portion and bottom 126 fitted over the seat portion, with top 125 and bottom 126 together supporting adornment/indicia that identify members of the team commensurate with indicia 122. This embodiment of the invention is concerned not only with a stadium decorated in this manner, but also a method that involves providing uniforms each including a uniform top that is sized and shaped to be capable of being fitted over the seat back portion of one of the seats of the stadium and a uniform bottom that is capable of being fitted over the seat portion of one of the seats, with the uniform top and the uniform bottom of each uniform together supporting uniform adornment/indicia that identify members of the team commensurate with team adornment/indicia decorating the stadium. The method next involves fitting the uniform tops and the uniform bottoms of the uniforms over the seat back portions and seat portions of the seats. Decorating a stadium in this fashion is interesting and fun for spectators and provides an enhanced stadium decoration. Any number of the seats of a stadium can be furnished with attached uniforms in accordance with the present embodiment, whether all of them or selected ones of them.

Figure 12:
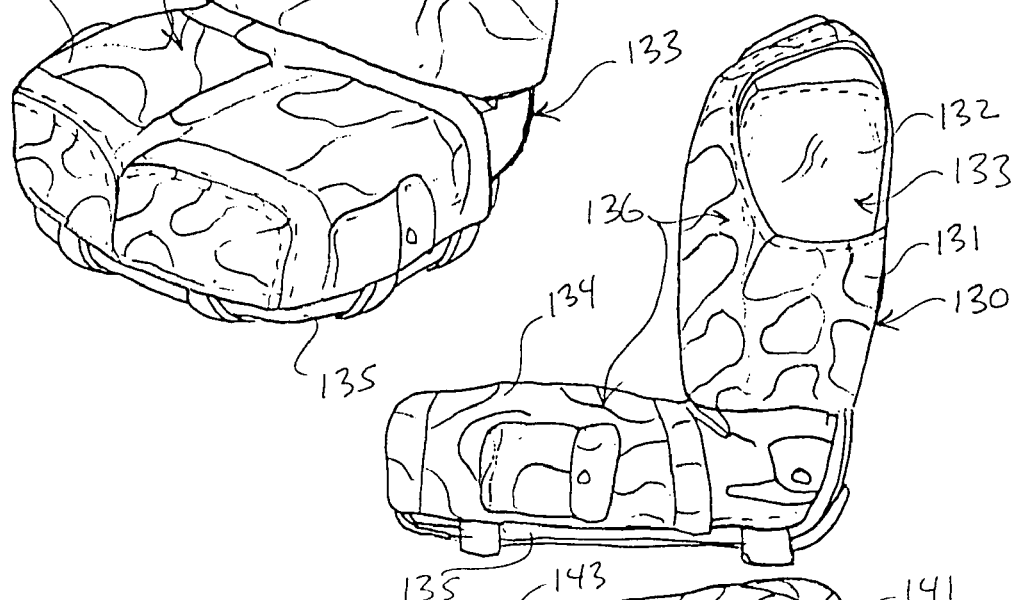
FIG. 12 is a side elevation of the embodiment depicted in FIG. 11.

Turning now to FIG. 11, depicted is another embodiment of the invention including a uniform 130 having a uniform top 131 fitted over a seat back portion 132 of a seat 133 and a uniform bottom 134 fitted over a seat portion 135 of seat 133. Top 131 and bottom 134 together support camouflage indicia 136 and the embodiment depicted in FIG. 11 is illustrative of this and of the overall design of uniform 130. FIG. 12 is exemplary of a side elevation of the embodiment depicted in FIG. 11, with the opposite side elevation being a mirror image. In structure, uniform 130 is similar to that of uniform 20 previously discussed. Therefore, further details of the structure of uniform 130 will not be discussed.

Figure 13:
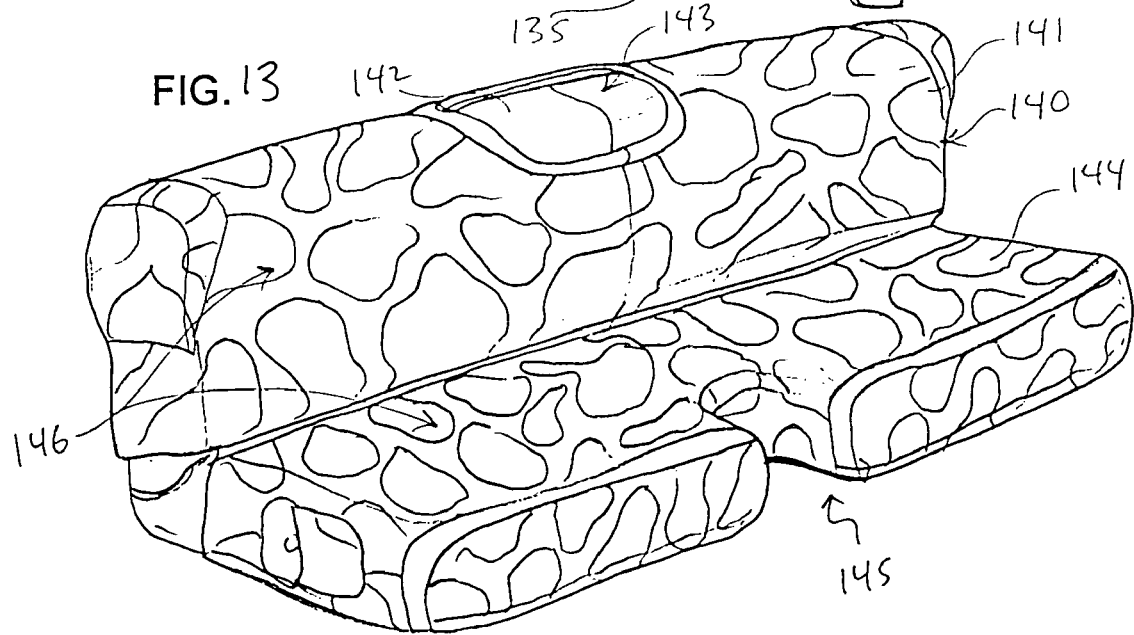
FIG. 13 is a perspective view of a uniform attached to a bench, in accordance with yet another embodiment of the invention, the uniform including a uniform top fitted over a seat back portion of the bench and a uniform bottom fitted over a seat portion of the bench.

With regard to FIG. 13, depicted is another embodiment of the invention including a uniform 140 having a uniform top 141 fitted over a seat back portion 142 of a seat 143 and a uniform bottom 144 fitted over a seat portion 145 of seat 143. Top 141 and bottom 144 together support camouflage indicia 146 and the embodiment depicted in FIG. 13 is illustrative of this and of the overall design of uniform 140. In FIG. 13, seat 143 is a bench and uniform 140 is elongated and adapted and sized to fit thereon in a manner described previously in connection with uniform 20. In structure, uniform 140 is similar to that of uniform 20 previously discussed. Therefore, further details of the structure of uniform 140 will not be discussed.

The invention is described above with reference to preferred embodiments. However, those skilled in the art will recognize that changes and modifications may be made to the described embodiments without departing from the nature and scope of the invention. Accordingly, any such changes and modifications to one or more of the embodiments herein chosen for purposes of illustration are intended to be included within the scope of the invention as assessed only by a fair interpretation of the ensuing claims.

Having fully described the invention in such clear and concise terms as to enable those skilled in the art to understand and practice the same, the invention claimed is:

1. Apparatus comprising:
    a seat including a seat portion and an attached seat back portion;
    a top, having a lower end, fitted over the seat back portion and a bottom, having a rearward end, fitted over the seat portion;
    an engagement assembly carried by one of the lower end of the top and the rearward end of the bottom;
    a complemental engagement assembly carried by the other of the lower end of the top and the rearward end of the bottom;
    the engagement assembly detachably engaged to the complemental engagement assembly detachably engaging the lower end of the top to the rearward end of the bottom;
    the top supporting first uniform adornment;
    the bottom supporting second uniform adornment;
    the first and second uniform adornments together forming the top and bottom as an identifying uniform of a member of an organization.

2. Apparatus of claim 1, wherein:
    the seat back portion includes a lower end attached to the seat portion and an opposing upper end; and
    the top includes a neck opening situated at the upper end of the seat back portion.

3. Apparatus of claim 2, wherein the top includes sleeves located on either side of the neck opening.

4. Apparatus of claim 3, wherein the top includes arm openings located on either side of the neck opening.

* * * * *